United States Patent [19]

Beveridge et al.

[11] 4,378,181

[45] Mar. 29, 1983

[54] GROUTING CAPSULE

[75] Inventors: Robert L. W. Beveridge, Troon; Thomas Robertson, Trabboch, both of Scotland

[73] Assignee: Imperial Chemical Industries Limited, London, England

[21] Appl. No.: 269,585

[22] Filed: Jun. 2, 1981

[30] Foreign Application Priority Data

Jun. 9, 1980 [GB] United Kingdom ................ 8018764

[51] Int. Cl.³ ........................ E21D 11/00; B65D 25/08
[52] U.S. Cl. ...................................... 405/261; 206/219
[58] Field of Search ........................ 405/260, 261, 303; 206/219, 220

[56] References Cited

U.S. PATENT DOCUMENTS 3,474,898 10/1969 Montgomery .................. 405/261 X
4,215,953 8/1980 Perraud .............................. 405/303
4,229,124 10/1980 Frey et al. ........................... 405/303

FOREIGN PATENT DOCUMENTS 2005161 10/1970 Fed. Rep. of Germany ...... 405/261
193177 12/1964 Sweden ............................... 405/261
1293620 10/1972 United Kingdom ............... 405/261
1363828 8/1974 United Kingdom ............... 405/261

Primary Examiner—Dennis L. Taylor
Attorney, Agent, or Firm—Cushman, Darby & Cushman

[57] ABSTRACT

A capsule of hardenable grouting adhesive material has a casing which, over a length of at least 1.0 times the diameter at a leading end of the casing, is sufficiently strong to prevent excessive distortion of the capsule when the capsule is projected into a drillhole at a velocity of 12 meters per second, and has at least one radially expansible portion extending over a length of at least 0.6 times the casing diameter which is expanded radially into engagement with the drillhole wall when the capsule is projected into the drillhole. The preferred capsule casing comprises a continuous tube of flexible material e.g. plastics material, partially reinforced by an adhered external layer of reinforcing material e.g. paper or plastics sheet.

The invention facilitates loading of capsules into drillholes in mine roofs by projection from a remotely controlled pneumatic loading machine and prevents the loaded capsules falling out of the drillholes.

12 Claims, 5 Drawing Figures

GROUTING CAPSULE

This invention relates to a capsule of hardenable adhesive grouting material of the kind used for securing reinforcing elements in drillholes in rock formations. The invention also includes a method of constructing the said capsule and a method of securing an anchor bolt in a drillhole by means of the said capsule.

The use of encapsulated hardenable grouting material for securing reinforcing elements in drillholes in rock formations in order to stabilise or reinforce the rock formation is well known and widely practised, for example, for securing reinforcing bolts in mine roofs. The hardenable compositions are generally based on hardenable resin or a water-settable material such as hydraulic cement or gypsum plaster. The composition is often supplied in the form of two fluent pasty components in separate compartments of a frangible capsule usually of plastics film, which is inserted in a drillhole and ruptured by rotating or vibrating the reinforcing element as the element is inserted into the drillhole, whereupon the two components are mixed and the mixture rapidly sets as a hard grout around the reinforcing element. The general procedure for the use of encapsulated grouting compositions for this purpose has been described in United Kingdom Patent Application Nos. 953,056, 998,240, 1,408,366 and 1,524,469.

In the initial techniques of employing encapsulated grouting compositions the capsules were inserted into the drillholes by hand and in mine roof supporting operations this involved the operator's presence in the hazardous position under the area of mine roof which required the support of the reinforcing elements. In the interests of the operator's safety, machinery has been developed for remote placement of the capsules and supporting elements which enable the operator to work from a safe position several meters distant from the unsupported mine roof which is being stabilised. In the current method the capsules are inserted into a pneumatic breech mechanism and projected by air pressure along a tube and upwardly into the drillhole. The reinforcing element is then inserted into the drillhole also by a machine controlled from a remote safe position.

The projection tube is necessarily only 1 to 2 millimeters wider than the capsules in diameter and the projection velocity is approximately 10 to 12 meters per second. Conventional capsules which have an outer casing of thin frangible plastics film, typically about $30\mu$ thick containing a hardenable composition having a viscosity of about 500,000 centipoises, are unable to withstand the distortion caused by projection at such velocity and frequently rupture or stick in the projection tube or drillhole with consequent waste of time and materials. Hitherto the frangible capsules have been protected from such damage by surrounding them with a tubular net of synthetic plastics material such as polyethylene, polystyrene or polyvinyl chloride. This net has the disadvantage that it prevents the radial expansion of the capsule when it is driven into the drillhole and the capsule therefore fails to engage the drillhole wall and tends to drop out of the drillhole. In order to retain the capsule in the drillhole a retainer element usually in the form of a flat star-shaped tough plastics disc is fixed to one end of the capsule. The provision of the net and retainer thus involves the introduction of a significant amount of plastics material into the drillhole and this material can weaken the strength of the set adhesive grout. In addition the net and retainer add considerably to the cost of the rock reinforcement operation.

It is an object of this invention to provide an improved capsule of grouting material which can be projected by air pressure into a drillhole and be retained in the drillhole by engagement of the capsule casing with the drillhole wall.

In accordance with this invention the capsule contains hardenable grouting material within an elongate frangible casing which casing, over a length of at least 1.0 times the diameter of the casing at a leading end and preferably at each end of the casing, consists of a material of sufficient strength such that, when the capsule is projected with the said leading end forward through a projection tube into a drillhole at a velocity of 12 meters per second, distortion or damage of the capsule which could impede the said projection is prevented, said casing also having at least one flexible radially expansible portion extending over a length of at least 0.6 and preferably 1.0 to 4.0 times the diameter of the casing, which flexible portion is expanded radially into engagement with the drillhole wall on impact of the capsule with the blind end of the drillhole when the capsule is projected into a drillhole at a velocity in the range from 7 to 12 meters per second. The flexible portion or portions preferably includes an intermediate portion of the capsule casing which intermediate portion preferably extends to a position within a distance of 5 times the diameter of the casing from the leading end of the casing. Each flexible portion should preferably be capable of expansion to 1.5 times its original diameter on impact without lateral confinement at 7 meters per second against a hard stationary surface.

The preferred capsule comprises a continuous tube of flexible frangible material, strengthened by the application of frangible reinforcing material along a portion of its surface, the flexible portion of the casing being provided by the non-reinforced portion of the flexible material. The reinforcing material may be applied to the flexible tube before filling the tube with the grouting composition but it is in most cases more convenient to apply it to the filled tube. In this latter case a frangible flexible tube containing the fluent hardenable grouting material and appropriate hardener has at least one layer of reinforcing material applied over a portion of its outer surface. The reinforcing layer may be adhered to the surface by a separate layer of adhesive material or it may be provided in the form of a self-adhesive material. Alternatively the reinforcement may be provided in the form of heat-shrinkable material which is loosely applied around the filled tube and tightly shrunk into position by controlled heating.

The reinforcement may conveniently be applied in the form of tape or tubular sleeve around the flexible tube. In the latter case the sleeve may advantageously extend beyond one end of the flexible tube, preferably the end which is the trailing end as the tube is projected into a drillhole, and be closed by flattening and folding the end to provide a transverse stiffened portion which engages the drillhole walls when the capsule is in position in a drillhole thereby providing additional capsule retaining means. Additional stiffening of the sleeve end-closure may be provided by enclosing a transverse strip of resilient material, for example tough plastics material, in the folds of the sleeve end-closure.

Convenient reinforcing materials include sheeted wrapping materials for example, paper, parchment, cellulose fabric and synthetic plastics film which may advantageously be in the form of self adhesive tape. Plastics film may also advantageously be in the form of heat-shrunk or cling-wrap film. Fibre reinforced sheet materials, such as, for example, paper tissue, reinforced by a fibre, for example, carbon fibre are also advantageous. The reinforcement must be sufficiently strong to provide the required protection against capsule distortion but must not be of such excessive strength and quantity as to prevent its mastication by the rotation of the rock reinforcement element as the element is inserted in the drillhole.

The flexible radially expansible portion of the capsule casing, and in particular the flexible frangible tubular casing of the preferred capsule, preferably comprises synthetic plastics film, for example, film of cellulose or cellulose acetate, a polymer or copolymer of ethylene, propylene, vinyl chloride, vinylidene chloride or ethylene terephthalate. The tubular casing is preferably closed at each end by gathering and binding with a compression closure member such as a metal clip as described in United Kingdom Patent Specification No. 1,297,554. Capsules containing both components of a two-component hardening composition may conveniently contain one of the components in a separate frangible flexible tube enclosed within the said frangible casing. If desired, the reinforcing materials may incorporate additives to modify the properties of the hardenable grouting material or the capsule surface. Such additives may include hardeners, accelerators, inhibitors, emulsifying agents, thixotropic agents or wetting agents for the grouting composition or lubricants to facilitate the passage of the capsule through the projection tube and drillhole.

Further in accordance with the invention, a capsule of hardenable grouting material is prepared by applying to a portion of the outer surface of a frangible flexible tubular casing containing hardenable grouting material at least one layer of reinforcing material extending over a length of at least 1.0 times the diameter of the casing at least at a leading end and preferably at each end of the casing, said reinforcing material being of sufficient strength such that when the capsule is projected through a projection tube into a drillhole at a velocity of 12 meters per second with the said leading end forward distortion or damage of the capsule which could impede the said projection is prevented, and leaving without reinforcement at least one portion of the flexible tubular casing extending over a length of at least 0.6 and preferably 1.0 to 4.0 times the diameter of the casing, whereby when the capsule is projected into a drillhole at a velocity in the range of 7 to 12 meters per second, the non-reinforced portion of the flexible casing is expanded radially into engagement with the drillhole wall on impact of the capsule with the blind end of the drillhole.

The invention also includes a method of securing a reinforcing element such as an anchor bolt in an oversize drillhole in a rock formation in which method a capsule of the invention is projected into the drillhole at a velocity sufficient to expand the flexible expansible portion of the capsule into engagement with the drillhole wall and the reinforcing element is inserted into the drillhole in a rotational or vibratory manner whereby the capsule is ruptured and the grouting composition subsequently hardens around the reinforcing element in the drillhole. The capsule is advantageously projected by air pressure through a projection tube into a drillhole which may be remote from the capsule loading operator.

The invention is further illustrated by the embodiments which are hereinafter described by way of example, with reference to the accompanying drawings wherein FIG. 1 shows diagrammatically a side view of a capsule before projection into a drillhole;

Figure 1:
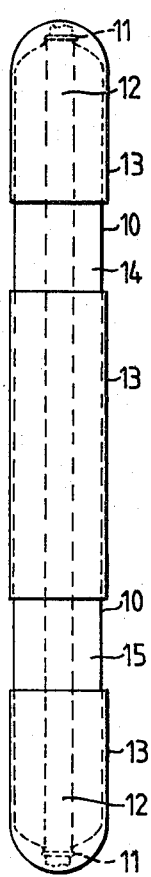

The capsule shown in FIG. 1 is a symmetrical reversible capsule having a flexible tubular casing 10 of seamless plastics tubing gathered and sealed at each end with a metal closure clip 11. The casing 10 contains one component of a two-component hardenable grouting composition. A second tubular casing 12 containing the second component of the two-component grouting composition is totally enclosed within the casing 10 and its ends extend through and are closed by the metal clips 11. A layer of reinforcing material 13 is wrapped in three sections around the ends and centre of the outside of the casing 10 leaving portions 14 and 15 of the casing 10 uncovered.

Figure 2:
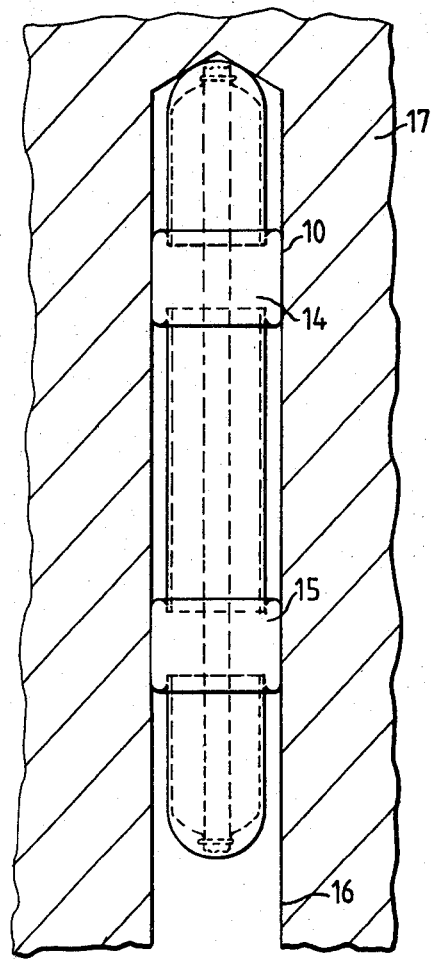
FIG. 2 shows diagrammatically the capsule of FIG. 1 after projection with air pressure into a drillhole.

When the capsule is projected against the blind end of a drillhole 16, in a rock mass 17, as shown in FIG. 2 the portions 14 and 15 are expanded radially into engagement with the drillhole wall. The capsule can thereby be retained securely in position in vertical drillholes in mine roofs.

Figure 3:
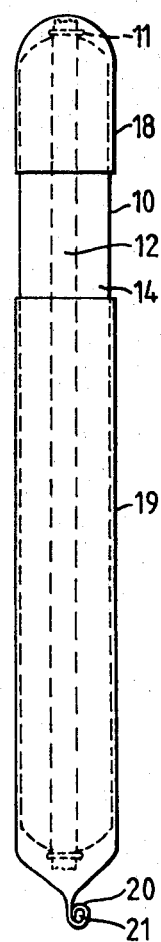
FIG. 3 shows diagrammatically a side view of a further capsule of the invention.
Figure 4:
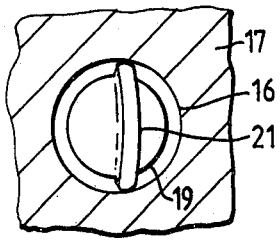
FIG. 4 is an end view of the capsule of FIG. 3 after projection into a drillhole.
Figure 5:
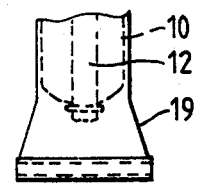
FIG. 5 is a fragmentary side view of the end of the capsule of FIG. 3 in a direction perpendicular to FIG. 3.

The capsule shown in FIG. 3 also comprises a flexible tubular casing 10 containing hardenable grouting composition as shown in FIGS. 1 and 2 but in this case one section of reinforcing material 18 is wrapped around one end of the capsule as in FIG. 1 and a second section of reinforcing material 19 extends beyond the other end of the casing 10 and is closed at that end by flattening and folding the end portion 20 around a resilient strip of plastics material 21. The strip 21 is slightly longer than the diameter of the drillhole in which the capsule is to be inserted and when the capsule is projected into a drillhole the strip 21 is bowed and thereby urged into frictional engagement with the drillhole wall to improve retention of the capsule in an upwardly directed drillhole. A portion 14 of the flexible casing remains uncovered as in the capsule of FIG. 1 and this portion is similarly expanded into engagement with the drillhole wall when the capsule is projected by air pressure into a drillhole.

The following Examples illustrate further the practice of the invention:

EXAMPLE 1

450 grams of hardenable resin composition containing 100 parts unsaturated polyester resin, 180 parts of ground dolomite, 5 parts of bentonite and having a viscosity of 500,000 centipoises (measured by Brookfield RVT viscometer spindle 6 at 0.5 r.p.m.) were packed in a flexible casing 10 of polyethylene terephthalate 34 cm long, 30 mm diameter and a 0.03 mm wall thickness and having bursting strength of 575 $kN/m^2$ (average).

The casing 10 enclosed a second casing 12 of polyethylene terephthalate 34 cm long, 18 mm diameter having a 0.03 mm wall thickness and containing 30 grams of hardener composition containing benzoyl peroxide for hardening the hardenable resin.

'Scotch' (Registered Trade Mark) self adhesive paper tape 15 cm in length, 0.165 mm thick, weighing 120 g/m² and having bursting strength of 300 kN/m² (average) was wrapped circumferentially as a single layer around the centre portion of the casing 10 and overlapped to 10 mm at the edges. Two further separate portions of the same tape each 6 mm in length were wrapped circumferentially as a single layer around the end portions of casing 10, overlapped to 10 mm at the edges and closed over the ends to leave two uncovered portions 14 and 15 each about 4 cm long.

The capsule was projected into an overhead drillhole 35 mm in diameter from a smooth bore plastic projection tube having an internal diameter of 32 mm at a velocity of 10 meters per second. The end portions 14 and 15 were expanded into firm engagement with the drillhole wall and the capsule was retained firmly in position at the blind end of the drillhole without any tendency to fall out. The capsule was ruptured and the resin and hardener compositions were mixed by an anchor bolt as the bolt was rotatably inserted into the drillhole. The bolt was anchored in a satisfactory manner in the drillhole by the subsequent setting of the resin (after 30 seconds) around the end of the bolt.

EXAMPLE 2

The capsule of this Example was constructed as shown in FIG. 3. 350 grams of component A and 30 grams of component B of a two-component grouting composition were contained respectively in polyethylene flexible casings 10 and 12 which were of the same dimensions and about the same strength as the casings 10 and 12 of Example 1. Component A contained 260 parts of Plaster of Paris, 100 parts of a 0.0% w.w. aqueous solution of hydroxypropylmethyl cellulose (HPMC) and 2 parts of a 40% w.w. aqueous solution of the sodium salt of an equimolar copolymer of acrylic acid and methyl acrylate having a viscosity of 3000 to 5000 centipoises. The viscosity of Component A was 1,100,000 centipoises as measured by Brookfield RVT viscometer with spindle 6 at 0.5 r.p.m. Component B contained 5 parts of aluminum sulphate hydrate, 13 parts china clay, 13 parts of the HPMC solution as used in Component A and 0.05 parts of the solution of copolymer as used in Component A.

A sheet of paper 8 cm long, 0.125 mm thick, weighing 83 g/m² and having bursting strength of 500 kN/m² (average) was adhered to one end of the casing 10 as in Example 1 with glue to form a reinforcing sleeve 18. A second sheet of identical material about 28 cm long was folded into the form of a reinforcing sleeve 19 and adhered to the outside of the flexible casing 10 with glue, leaving a 6 cm length 14 of the casing 10 between the two sleeves uncovered. The paper at the end of the sleeve 19 extending beyond the casing 10 was folded around a strip 21 of resilient polyvinyl chloride 37 mm×4 mm×0.6 mm and secured with glue.

When projected into a drillhole as described in Example 1, the uncovered portion 14 was expanded into firm engagement with the drillhole wall and the strip 21 also engaged the drillhole wall. The components A and B were mixed satisfactory when an anchor bolt was rotatably inserted into the drillhole and the bolt was firmly anchored in the hole when the mixed grouting composition set hard after about 45 seconds.

We claim:

1. A grouting capsule containing hardenable grouting material within an elongate frangible casing which casing, over a length of at least 1.0 times the diameter of the casing at a leading end of the casing, consists of a material of sufficient strength such that, when the capsule is projected with the said leading end forward through a projection tube into a drillhole at a velocity of 12 meters per second, distortion or damage of the capsule which could impede the said projection is prevented, said casing also having at least one flexible radially expansible portion extending over a length of at least 0.6 times the diameter of the casing, which flexible portion is expanded radially into engagement with the drillhole wall on impact of the capsule with the blind end of the drillhole when the capsule is projected into a drillhole at a velocity in the range from 7 to 12 meters per second.

2. A capsule as claimed in claim 1 wherein a length of at least 1.0 times the diameter of the casing at each end of the casing consists of a material which prevents distortion or damage of the capsule when the capsule is projected through a projection tube at a velocity of 12 meters per second.

3. A capsule as claimed in claim 1 wherein the flexible radially expansible portion extends over a length of 1.0 to 4.0 times the diameter of the casing.

4. A capsule as claimed in claim 1 comprising a continuous tube of flexible frangible material, strengthened by the application of frangible reinforcing material along a portion of its surface, the flexible portion of the casing being provided by the non-reinforced portion of the flexible material.

5. A capsule as claimed in claim 4 wherein a frangible flexible tube containing the fluent hardenable grouting material has at least one layer of reinforcing material applied over at least one portion of its outer surface.

6. A capsule as claimed in claim 4 wherein the reinforcing material is in the form of tape or tubular sleeve material applied around the tube of flexible material.

7. A capsule as claimed in claim 6 wherein the reinforcing material is in the form of a sleeve extending beyond one end of the flexible tube, said sleeve being closed by flattening and folding its end to provide a transverse stiffened portion for engagement with the drillhole wall.

8. A capsule as claimed in claim 7 wherein a transverse strip of resilient material is enclosed in the folds of the sleeve end-closure.

9. A capsule as claimed in claim 4 wherein the reinforcing material is selected from the group consisting of paper, parchment, cellulose fabric, fibre-reinforced paper tissue and synthetic plastics film.

10. A capsule as claimed in claim 1 wherein the flexible radially expansible portion of the casing comprises synthetic plastics film selected from the group consisting of cellulose, cellulose acetate, polymers and copolymers of ethylene, propylene, vinyl chloride, vinylidene chloride and ethylene terephthalate.

11. A method of preparing a capsule of hardenable grouting material which comprises applying to a portion of the outer surface of a frangible flexible tubular casing containing hardenable grouting material at least one layer of reinforcing material extending over a length of at least 1.0 times the diameter of the casing, at least at one end of the casing, said reinforcing material being of sufficient strength such that, when the capsule is projected through a projection tube into a drillhole at a velocity of 12 meters per second with the said one end forward, distortion or damage of the capsule which could impede the said projection is prevented, and leaving without reinforcement a portion of the flexible tubular casing extending over a length of at least 0.6 times the diameter of the casing, whereby when the capsule is projected into a drillhole at a velocity in the range from 7 to 12 meters per second the non-reinforced portion of the flexible casing is expanded radially into engagement with the drillhole wall on impact of the capsule with the blind end of the drillhole.

12. A method of securing a reinforcing element in an oversize drillhole in a rock formation in which method a capsule as claimed in claim 1 is projected into the drillhole at a velocity sufficient to expand the flexible expansible portion of the capsule into engagement with the drillhole wall and the reinforcing element is inserted into the drillhole in a manner whereby the capsule is ruptured and the grouting composition subsequently hardens around the reinforcing element in the drillhole.

* * * * *